US011453817B2

(12) United States Patent
Mack et al.

(10) Patent No.: US 11,453,817 B2
(45) Date of Patent: *Sep. 27, 2022

(54) STABILIZATION OF IODIDE-CONTAINING BRINES AND BRINE MIXTURES

(71) Applicant: TETRA Technologies, Inc., Conroe, TX (US)

(72) Inventors: Arthur G. Mack, Conroe, TX (US); Drew A. Fowler, Humble, TX (US); Phillip A. Vincent, Spring, TX (US)

(73) Assignee: TETRA TECHNOLOGIES, INC., Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,154

(22) Filed: Oct. 24, 2017

(65) Prior Publication Data

US 2019/0119557 A1 Apr. 25, 2019

(51) Int. Cl.
*C09K 8/86* (2006.01)
*C09K 8/528* (2006.01)
*C09K 8/06* (2006.01)
*E21B 21/00* (2006.01)
*C09K 8/506* (2006.01)
*C09K 8/03* (2006.01)

(52) U.S. Cl.
CPC .............. *C09K 8/528* (2013.01); *C09K 8/032* (2013.01); *C09K 8/06* (2013.01); *C09K 8/506* (2013.01); *C09K 8/86* (2013.01); *E21B 21/00* (2013.01)

(58) Field of Classification Search
CPC .......... C09K 8/032; C09K 8/06; C09K 8/506; C09K 8/528; C09K 8/86; C09K 8/575; E21B 21/00
See application file for complete search history.

(56) References Cited

U.S. PATENT DOCUMENTS

| | | |
|---|---|---|
| 1,911,195 A | 5/1933 | Kepfer |
| 2,191,312 A | 2/1940 | Cannon |
| 2,898,294 A | 8/1959 | Priest et al. |
| 3,275,552 A | 9/1966 | Kern et al. |
| 4,292,183 A | 9/1981 | Sanders |
| 4,444,668 A * | 4/1984 | Walker ..................... C09K 8/22 166/902 |
| 4,465,601 A | 8/1984 | Pasztor, Jr. |
| 4,486,340 A | 12/1984 | Glass, Jr. |
| 4,566,976 A | 2/1986 | House et al. |
| 5,076,364 A | 12/1991 | Hale et al. |
| 5,330,683 A | 7/1994 | Sufrin |
| 5,415,230 A | 5/1995 | Fisk, Jr. et al. |
| 5,728,652 A | 3/1998 | Dobson, Jr. |
| 5,846,914 A | 12/1998 | Finkelstein et al. |
| 6,080,704 A | 6/2000 | Halliday et al. |
| 6,100,222 A | 8/2000 | Vollmer et al. |
| 6,124,244 A | 9/2000 | Murphey |
| 6,489,270 B1 | 12/2002 | Vollmer et al. |
| 6,617,285 B2 | 9/2003 | Crews |
| 6,635,604 B1 | 10/2003 | Halliday et al. |
| 6,730,234 B2 | 5/2004 | Symens et al. |
| 6,843,931 B2 | 1/2005 | Sapienza |
| 7,048,961 B2 | 5/2006 | Knauf |
| 7,078,370 B2 | 7/2006 | Crews |
| 7,306,039 B2 | 12/2007 | Wang et al. |
| 7,825,073 B2 | 11/2010 | Welton et al. |
| 7,910,524 B2 | 3/2011 | Welton et al. |
| 7,960,315 B2 | 6/2011 | Welton et al. |
| 8,003,578 B2 | 8/2011 | Monroe et al. |
| 8,030,254 B2 | 10/2011 | Phatak et al. |
| 8,067,342 B2 | 11/2011 | Lin et al. |
| 8,071,059 B2 | 12/2011 | Filippi et al. |
| 8,381,537 B2 | 2/2013 | Morita et al. |
| 8,697,611 B2 | 4/2014 | Zhang et al. |
| 8,853,135 B2 | 10/2014 | Phatak et al. |
| 8,936,111 B2 | 1/2015 | Maghrabi et al. |
| 8,950,492 B2 | 2/2015 | Maghrabi et al. |
| 9,593,276 B2 | 3/2017 | Livanec |
| 9,868,890 B2 | 1/2018 | Alleman |
| 2003/0092581 A1 | 5/2003 | Crews |
| 2004/0124013 A1 | 7/2004 | Wiesner et al. |
| 2005/0038199 A1 | 2/2005 | Wang et al. |
| 2005/0101491 A1 | 5/2005 | Vollmer |
| 2005/0253110 A1 | 11/2005 | Chauhan et al. |
| 2008/0093579 A1 | 4/2008 | Knauf |

(Continued)

FOREIGN PATENT DOCUMENTS

| | | |
|---|---|---|
| CN | 106928930 A | 7/2017 |
| EP | 0194254 A1 | 9/1986 |

(Continued)

OTHER PUBLICATIONS

International Search Report and Written Opinion for related PCT application PCT/US2018/057205 dated Dec. 14, 2018.
U.S. Appl. No. 15/468,940 Final Office Action dated Jan. 2, 2019 (10 pages).
International Search Report and Written Opinion for related PCT application PCT/US2018/057200 dated Dec. 14, 2018.
International Search Report and Written Opinion for related PCT application PCT/US2018/057202 dated Jan. 7, 2019.
U.S. Appl. No. 15/791,748 Non-Final Office Action dated Feb. 25, 2019 (28 pages).
U.S. Appl. No. 15/468,842 Final Office Action dated Apr. 25, 2019 (12 pages).
Kaminski, et al., "Clearly Different", Reprinted from Oilfield Technology, Jul. 2012, 4 pgs.

(Continued)

*Primary Examiner* — Alicia Bland
(74) *Attorney, Agent, or Firm* — Bracewell LLP; Constance G. Rhebergen; Eleanor L. Tyson

(57) ABSTRACT

A composition for use in a wellbore activity, the composition comprising an iodide brine, the iodide brine operable to be used in the wellbore activity, the iodide brine comprising an iodide salt, an aqueous fluid, and an iodide protectant, the iodide protectant operable to prevent the presence of free iodine in the iodide brine, where the iodide protectant is present in the range between 0.001 v/v % and 5 v/v % of the iodide brine.

14 Claims, No Drawings

(56) References Cited

U.S. PATENT DOCUMENTS

| | | |
|---|---|---|
| 2008/0269081 A1 | 10/2008 | Lin et al. |
| 2009/0048126 A1 | 2/2009 | Phatak et al. |
| 2010/0016180 A1 | 1/2010 | Scoggins et al. |
| 2010/0093565 A1 | 4/2010 | Phatak et al. |
| 2010/0130388 A1 | 5/2010 | Phatak et al. |
| 2010/0163255 A1 | 7/2010 | Horton et al. |
| 2010/0303737 A1 | 12/2010 | Hurtig |
| 2010/0311621 A1* | 12/2010 | Kesavan ............... C09K 8/08 507/212 |
| 2012/0118569 A1 | 5/2012 | Deville |
| 2013/0098615 A1 | 4/2013 | Perez et al. |
| 2013/0168095 A1 | 7/2013 | Loveless et al. |
| 2013/0231268 A1 | 9/2013 | Ghosh et al. |
| 2014/0148366 A1 | 5/2014 | Reyes Bautista |
| 2014/0221256 A1* | 8/2014 | Holtsclaw ............ C08L 33/14 507/211 |
| 2014/0262283 A1 | 9/2014 | Savari et al. |
| 2014/0352961 A1 | 12/2014 | Dobson, Jr. et al. |
| 2015/0096808 A1 | 4/2015 | Misino et al. |
| 2016/0177698 A1 | 6/2016 | Schultheiss et al. |
| 2016/0208158 A1 | 7/2016 | Monahan et al. |
| 2017/0088762 A1 | 3/2017 | Zhang et al. |
| 2017/0145284 A1 | 5/2017 | Davidson et al. |
| 2017/0158939 A1 | 6/2017 | Chen et al. |
| 2017/0158976 A1* | 6/2017 | O'Rear ................ C10L 3/101 |
| 2017/0190954 A1 | 7/2017 | Schultheiss et al. |
| 2017/0292055 A1 | 10/2017 | Alleman |
| 2018/0016484 A1 | 1/2018 | Ray et al. |

FOREIGN PATENT DOCUMENTS

| | | | |
|---|---|---|---|
| EP | 2463350 A1 | 6/2012 | |
| EP | 1863890 B1 | 10/2014 | |
| GB | 2250761 A | 6/1992 | |
| GB | 2334279 A | 8/1999 | |
| JP | 56098482 A | 8/1981 | |
| KR | 20040043935 A | 5/2004 | |
| WO | 9821291 A1 | 5/1998 | |
| WO | 03064555 A1 | 8/2003 | |
| WO | 2004050557 A1 | 6/2004 | |
| WO | 2009126548 A2 | 10/2009 | |
| WO | 20015068865 A1 | 5/2015 | |
| WO | 2016025137 A1 | 2/2016 | |
| WO | 2017165754 A1 | 9/2017 | |

OTHER PUBLICATIONS

Section B14 Solubility in Non-Aqueous Solvents, Formate Technical Manual, Mar. 2013, 1-4, Version 1, Cabot Specialty Fluids, 4 pgs.

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.

PCT/US2017/023995 International Search Report and Written Opinion dated May 24, 2017; 15 Pgs.

PCT/US2017/023996 International Search Report and Written Opinion dated May 24, 2017; 16 Pgs.

PCT/US2017/024008 International Search Report and Written Opinion dated May 24, 2017; 16 Pgs.

Telang, et al., , Effective Inhibition of Mannitol Crystallization in Frozen Solutions by Sodium Chloride, Pharmaceutical Research (Apr. 2003), vol. 20, No. 4, 660-667; 8 pgs.

* cited by examiner

STABILIZATION OF IODIDE-CONTAINING BRINES AND BRINE MIXTURES

TECHNICAL FIELD

Described are compositions for use in wellbore fluids in well operations. More specifically, described are compositions with low crystallization temperatures and high densities for use in wellbore fluids in well operations.

DESCRIPTION OF THE RELATED ART

When used in well operations, brines can crystallize if exposed to lower temperatures and/or higher pressures. As the density of a brine increases above the salt side of the eutectic point so does the true crystallization temperature (TCT) and pressure crystallization temperature (PCT), which can cause blockage to tubulars in a wellbore or in equipment on the surface if the fluid crystallizes. If crystallization occurs and the solid is filtered from the brine, this will lead to a decrease in fluid density and can cause wellbore stability issues or a blowout. Applying pressure to a brine at a density above the eutectic point will lead to an increase in density, which in turn can lead to crystallization.

Zinc salts, such as zinc bromide ($ZnBr_2$), can be used to increase the density of brines to greater than 14.2 lb/gal while maintaining a low crystallization temperature. However, zinc is a marine pollutant and can cause issues in the processing stage if residual zinc is in the oil sent to the refinery. Addition of zinc brines can cause a sharp decrease in pH leading to high corrosion rates. Cesium formate ($CHCsO_2$) can be used to increase the density of brines to greater than 13.1 lb/gal. Cesium formate is available only in limited supply making it cost-prohibitive for wellbore operations requiring significant volumes of fluid.

Iodide brines can be formulated with higher densities than brines containing chloride or bromide compounds. However, iodide brines are unstable and form iodine when exposed to oxygen or carbon dioxide in air. Brines can pick up carbon dioxide and oxygen from the air when being circulated through a wellbore. Oxygen can oxidize the iodide ion ($I^-$) to iodine ($I_2$). The conversion of iodide to iodine is detrimental to properties of the brine such as discoloration and precipitation. Additionally, the free iodine can destabilize additives present in the brine. Due to this instability, iodide brines have not been widely used in commercial wellbore activity applications.

SUMMARY

Described are compositions for use in wellbore fluids in well operations. More specifically, described are compositions with low crystallization temperatures and high densities for use in wellbore fluids in well operations.

In a first aspect, a composition for use in a wellbore activity is provided. The composition includes an iodide brine. The iodide brine operable to be used in the wellbore activity. The iodide brine includes an iodide salt, an aqueous fluid, and an iodide protectant, the iodide protectant operable to prevent the presence of free iodine in the iodide brine, where the iodide protectant is present in the range between 0.001 v/v % and 5 v/v % of the iodide brine.

In certain aspects, the iodide salt is selected from the group consisting of lithium iodide, sodium iodide, potassium iodide, rubidium iodide, cesium iodide, magnesium iodide, calcium iodide, strontium iodide, and combinations of the same. In certain aspects, the iodide brine further includes an additional halide. In certain aspects, the additional halide includes a monovalent halide selected from the group consisting of lithium chloride, lithium bromide, sodium chloride, sodium bromide, potassium chloride, potassium bromide, cesium chloride, cesium bromide, rubidium chloride, rubidium bromide, and combinations of the same. In certain aspects, the additional halide includes a divalent halide selected from the group consisting of calcium bromide, calcium chloride, magnesium bromide, magnesium chloride, strontium bromide, strontium chloride, and combinations of the same. In certain aspects, the iodide protectant is selected from the group consisting of amines, amino alcohols, hydroxylamines, hydrazines, erythorbic acid and derivative erythorbate salts, ascorbic acid and derivative ascorbate salts, citric acid and derivative citrate salts, and combinations of the same.

In a second aspect, a method of using an iodide brine during a wellbore activity is provided. The method includes the steps of introducing the iodide brine into a wellbore and completing the wellbore activity in the wellbore.

In certain aspects, the wellbore activity is selected from the group consisting of drilling, reservoir drilling, completion activities, workover activities, well intervention activities, or as a packer fluid.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

The compositions and methods described are directed to iodide brines containing an iodide-containing brine and an iodide protectant.

Advantageously, the addition of an iodide protectant described here demonstrates the ability to stabilize the iodide-containing brines by removing free iodine and protecting against further oxidation. Advantageously, the addition of an iodide protectant to the iodide-containing brines can immediately reduce the presence of iodine even at room temperature as compared to the use of glycerol or sorbitol which can reduce the free iodine, but requires an increase in temperature above ambient to increase the efficacy. Advantageously, the iodide brines have greater densities than conventional divalent and monovalent chloride and bromide brines without the addition of cesium formate or zinc bromide.

As used here, "iodide salt" refers to salts taking the form $XI$, where $I$ is iodide and where $X$ can be an alkali metal (Group 1), including lithium (Li), sodium (Na), potassium (K), rubidium (Rb), and cesium (Cs); or taking the form $ZI_2$, where $Z$ can be an alkaline earth metal (Group 2), including magnesium (Mg), calcium (Ca), and strontium (Sr).

As used here, "iodide protectant" refers to a compound that both scavenges free oxygen present in a brine to prevent further oxidation of the iodide to iodine and reacts with iodine present to produce iodide and stabilize the brine.

As used here, "divalent halide" refers to a salt compound containing an alkaline earth metal (Group 2), including magnesium (Mg), calcium (Ca), and strontium (Sr) and a halogen (Group 17) other than iodine. Examples of the divalent halide can include calcium bromide, calcium chloride, magnesium bromide, magnesium chloride, strontium bromide, strontium chloride, and combinations of the same.

As used here, "monovalent halide" refers to a salt compound containing an alkali metal (Group 1), including lithium (Li), sodium (Na), potassium (K), rubidium (Rb), and cesium (Cs) and a halogen (Group 17) other than iodine. Examples of the monovalent halide can include lithium chloride, lithium bromide, sodium chloride, sodium bromide, potassium chloride, potassium bromide, cesium chloride, cesium bromide, rubidium chloride, rubidium bromide, and combinations of the same.

As used here, "additional halide" refers to a monovalent halide, divalent halide, and combinations of the same.

As used here, "brine" refers a liquid fluid containing water and soluble salts.

The iodide brines described here include an iodide-containing brine and an iodide protectant. The iodide-containing brine can be any aqueous fluid containing an iodide salt. In at least one embodiment, the iodide salt can include lithium iodide, sodium iodide, potassium iodide, rubidium iodide, cesium iodide, magnesium iodide, calcium iodide, strontium iodide, and combinations of the same. In at least one embodiment, the iodide salt can include sodium iodide, potassium iodide, calcium iodide, and combinations of the same. In at least one embodiment, the iodide salt can include lithium iodide, sodium iodide, potassium iodide, rubidium iodide, cesium iodide, and combinations of the same. In at least one embodiment, the iodide salt can include magnesium iodide, calcium iodide, strontium iodide, and combinations of the same.

The aqueous fluid can be any water-containing fluid that can be used in wellbore activities. Examples of the aqueous fluid can include water, brine, water-based drilling fluids, and combinations of the same. In at least one embodiment, the aqueous fluid is water. In at least one embodiment, the aqueous fluid is brine.

In addition to the iodide salt, the iodide-containing brine can include an additional halide.

Examples of the iodide protectant can include amines, amino alcohols, hydroxylamines, hydrazines, erythorbic acid and derivative erythorbate salts, ascorbic acid and derivative ascorbate salts, and citric acid and derivative citrate salts, and combinations of the same. Examples of amines include ethylenediamine (EDA), diethylenetriamine (DETA), triethylenetetramine (TETA), tetraethylenepentamine (TEPA), pentaethylenehexamine (PEHA), aminoethylpiperazine (AEP), hexaethyleneheptamine (HEHA), piperazine, methoxypropylamine (MOPA), morpholine, n-aminopropylmorpholine (APM), and combinations of the same. Examples of amino alcohols include monoethanolamine (MEA), diethanolamine (DEA), triethanolamine (TEA), diethylaminoethanol (DEAE), dimethylethanolamine (DMEA), N-[3-aminopropyl]diethanolamine, aminoethylethanolamine (AEEA), 4-[2-hydroxyethyl]morpholine, diglycolamine, and combinations of the same. Examples of hydroxylamines include diethylhydroxylamine (DEHA), dimethylhydroxylamine (DMHA), hydroxylamine, and combinations of the same. Examples of erythorbate salts include sodium erythorbate. The iodide protectant can be designed to include iodide protectants that can begin to react immediately and those that react as activated, such that the iodide protectant provides both immediate scavenging of dissolved oxygen and long-term protection from oxidation of iodide to iodine.

The amount of iodide protectant in the iodide brine can be in the range between 0.001 percent volume/volume (v/v %) to 5 v/v % of the iodide brine and alternately in the range between 0.01 v/v % and 2.5 v/v %. The amount of iodide protectant can be added until discoloration of the iodide-containing brine disappears or is reduced. An excess amount of iodide protectant above the amount needed to remove the discoloration, but below 5 v/v % can continue to operate in the fluid. An amount of iodide protectant greater than 5 v/v % can negatively impact the pH, such as increasing the pH to a point where hydroxides precipitate, and can reduce the density of the iodide-containing brine.

The iodide brines can be prepared by mixing the iodide-containing brine and iodide protectant at the wellsite or at an offsite location. In an embodiment where the iodide brine is prepared at the wellsite, additional amounts of the components can be added after the initial preparation of the stabilized iodide brine. In an embodiment where the iodide brine is prepared offsite, additional amounts of the iodide salt and iodide protectant can be added at the wellsite to maintain the desired properties.

The iodide brines described here can be used in any wellbore activity during the drilling and completion phases of an oil and gas producing well that requires a brine-based fluid. Wellbore activities can include drilling, reservoir drilling, completion activities, workover activities, well intervention activities, or as a packer fluid.

EXAMPLE

Example. This example analyzed the use of an iodide protectant in an iodide brine. An iodide-containing brine contained 34.0 wt % water, 13.6 wt % NaBr, 42.4 wt % NaI, and 10 wt % sorbitol. The iodide-containing brine had a density of 15.0 lb/gal measured at a temperature of 60 deg F. and a TCT of 42 deg F. The iodide-containing brine was allowed to stand at ambient temperature for one month at which time the iodide-containing brine was a dark orange color. Sample 1 was maintained as a control sample. Samples 2-7 were created by adding varying amounts of the iodide protectant DEHA to the aged iodide-containing brine to produce iodide brines. The samples were then subjected to American Public Health Associate (APHA) color tests according to ASTM D1209 at times following addition of the DEHA, as indicated in Table 1. The AHPA color tests were conducted to determine the minimum treatment level.

TABLE 1

Properties of brines at ambient temperatures

| | DEHA Conc. v/v % | APHA after 5 mins | APHA after 1 hour | APHA after 18 hours |
|---|---|---|---|---|
| Sample 1 | 0.00 | >1000 | >1000 | >1000 |
| Sample 2 | 0.1 | 22 | 18 | 18 |
| Sample 3 | 0.01 | 27 | 20 | 18 |
| Sample 4 | 0.008 | 24 | 22 | 20 |
| Sample 5 | 0.006 | 36 | 25 | 20 |
| Sample 6 | 0.004 | 209 | 40 | 20 |
| Sample 7 | 0.002 | >1000 | >1000 | 955 |

The data in Table 1 demonstrate that a small amount of DEHA, less than 0.005 v/v % can remove free iodine. The data also show that the addition of DEHA can prevent the oxidation of iodide and the production of free iodine. The data also show the time to remove free iodine at ambient temperature based on scavenger concentration.

Although the present embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations of the same are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

What is claimed is:

1. A composition for use in a wellbore activity, the composition comprising:
    an iodide brine, the iodide brine operable to be used in the wellbore activity, the iodide brine comprising:
        an iodide salt;
        an aqueous fluid; and
        an iodide protectant, the iodide protectant reduces the presence of free iodine in the iodide brine by reacting with iodine present such that the iodide brine is stable, where the iodide protectant is present in the range between 0.001 v/v % and 5 v/v % of the iodide brine, where the iodide protectant is selected from the group consisting of amines, amino alcohols, hydroxylamines, erythorbic acid, ascorbic acid, and combinations of the same, where the amine is selected from the group consisting of ethylenediamine (EDA), diethylenetriamine (DETA), triethylenetetramine (TETA), tetraethylenepentamine (TEPA), pentaethylenehexamine (PEHA), aminoethylpiperazine (AEP), hexaethyleneheptamine (HEHA), piperazine, methoxypropylamine (MOPA), morpholine, n-aminopropylmorpholine (APM), and combinations of the same, where the hydroxylamine is selected from the group consisting of diethylhydroxylamine (DEHA), dimethylhydroxylamine (DMHA), hydroxylamine, and combinations of the same,
    where an APHA value of the composition is between 18 and 209 as determined according to ASTM D12094.

2. The composition of claim 1, where the iodide salt is selected from the group consisting of lithium iodide, sodium iodide, potassium iodide, rubidium iodide, cesium iodide, magnesium iodide, calcium iodide, strontium iodide, and combinations of the same.

3. The composition of claim 1, where the iodide brine further comprises an additional halide.

4. The composition of claim 3, where the additional halide comprises a monovalent halide selected from the group consisting of lithium chloride, lithium bromide, sodium chloride, sodium bromide, potassium chloride, potassium bromide, cesium chloride, cesium bromide, rubidium chloride, rubidium bromide, and combinations of the same.

5. The composition of claim 3, where the additional halide comprises a divalent halide selected from the group consisting of calcium bromide, calcium chloride, magnesium bromide, magnesium chloride, strontium bromide, strontium chloride, and combinations of the same.

6. The composition of claim 1, further comprising an additional iodide protectant selected from the group consisting of amino alcohols, hydroxylamines, hydrazines, erythorbate salts, ascorbate salts, citrate salts, and combinations of the same.

7. A method of using an iodide brine during a wellbore activity, the method comprising the steps of:
    introducing the iodide brine into a wellbore, the iodide brine comprising:
        an iodide salt,
        an aqueous fluid, and
        an iodide protectant, the iodide protectant operable to prevent the presence of free iodine in the iodide-containing brine, where the iodide protectant is present in the range between 0.001 v/v % and 5 v/v % of the iodide brine, where the iodide protectant is selected from the group consisting of amines, amino alcohols, hydroxylamines, hydrazines, erythorbic acid, ascorbic acid, and combinations of the same,
        where an APHA value of the iodine brine is between 18 and 209 as determined according to ASTM D1209; and
    completing the wellbore activity in the wellbore.

8. The method of claim 7, where the wellbore activity is selected from the group consisting of drilling, reservoir drilling, completion activities, workover activities, well intervention activities, or as a packer fluid.

9. The method of claim 7, where the iodide salt is selected from the group consisting of lithium iodide, sodium iodide, potassium iodide, rubidium iodide, cesium iodide, magnesium iodide, calcium iodide, strontium iodide, and combinations of the same.

10. The method of claim 7, where the iodide brine further comprises an additional halide.

11. The method of claim 10, where the additional halide comprises a monovalent halide selected from the group consisting of lithium chloride, lithium bromide, sodium chloride, sodium bromide, potassium chloride, potassium bromide, cesium chloride, cesium bromide, rubidium chloride, rubidium bromide, and combinations of the same.

12. The method of claim 10, where the additional halide comprises a divalent halide selected from the group consisting of calcium bromide, calcium chloride, magnesium bromide, magnesium chloride, strontium bromide, strontium chloride, and combinations of the same.

13. The composition of claim 7, wherein the amino alcohols are selected from the group consisting of amino alcohols include monoethanolamine (MEA), diethanolamine (DEA), triethanolamine (TEA), diethylaminoethanol (DEAE), dimethylethanolamine (DMEA), N-[3-aminopropyl]diethanolamine, aminoethylethanolamine (AEEA), 4-[2-hydroxyethyl]morpholine, diglycolamine, and combinations of the same.

14. The composition of claim 7, wherein the hydroxylamines are selected from the group consisting of diethylhydroxylamine (DEHA), dimethylhydroxylamine (DMHA), hydroxylamine, and combinations of the same.

* * * * *

UNITED STATES PATENT AND TRADEMARK OFFICE
CERTIFICATE OF CORRECTION

| | | |
|---|---|---|
| PATENT NO. | : 11,453,817 B2 | Page 1 of 1 |
| APPLICATION NO. | : 15/792154 | |
| DATED | : September 27, 2022 | |
| INVENTOR(S) | : Mack et al. | |

It is certified that error appears in the above-identified patent and that said Letters Patent is hereby corrected as shown below:

In the Claims

In Column 5, Claim 1, Line 57 should read:
-- and 209 as determined according to ASTM D1209. --

Signed and Sealed this
Eighth Day of November, 2022

Katherine Kelly Vidal
*Director of the United States Patent and Trademark Office*